United States Patent [19]

Rumpp et al.

[11] 4,434,859
[45] Mar. 6, 1984

[54] HAMMER DRILL FOR PERFORMING ROTARY DRILLING OR PERCUSSIVE DRILLING

[75] Inventors: Gerhard Rumpp, Inning; Dieter Scholz, Unterpfaffenhofen; Manfred Spieth, Martinsried, all of Fed. Rep. of Germany

[73] Assignee: Hilti Atkiengesellschaft, Schaan, Liechtenstein

[21] Appl. No.: 392,121

[22] Filed: Jun. 25, 1982

[30] Foreign Application Priority Data

Jun. 29, 1981 [DE] Fed. Rep. of Germany ....... 3125454

[51] Int. Cl.³ ............................................... E02D 7/02
[52] U.S. Cl. ........................................ 173/48; 173/13; 173/133; 173/114; 279/75; 279/19.4
[58] Field of Search ............... 173/47, 48, 115, 131, 173/132, 133, 13, 114; 279/75, 19, 19.1, 19.2, 19.4, 19.6, 19.7

[56] References Cited

U.S. PATENT DOCUMENTS

| 3,000,225 | 9/1961 | Taylor | 173/48 |
| 3,145,782 | 8/1964 | De Bruin | 173/48 |
| 3,507,337 | 4/1970 | Chromy | 173/48 |
| 3,789,933 | 2/1974 | Jarecki | 173/48 |
| 3,809,168 | 5/1974 | Fromm | 173/13 |
| 4,107,949 | 8/1978 | Wanner et al. | 279/75 |
| 4,131,165 | 12/1978 | Wanner et al. | 173/48 |
| 4,174,113 | 11/1979 | Eckman | 279/75 |
| 4,349,074 | 9/1982 | Ince | 173/48 |

Primary Examiner—E. R. Kazenske
Assistant Examiner—Hien H. Phan
Attorney, Agent, or Firm—Toren, McGeady and Stanger

[57] ABSTRACT

A hammer drill for performing percussive drilling or rotary drilling includes a housing and a tool holder mounted on and axially displaceable relative to the housing, the tool holder contains a retainer sleeve mounting locking member for securing the shank of a tool in the holder. When the hammer drill is used only for rotary drilling, the retainer sleeve is displaced into contacting engagement with the housing for centering the tool holder. The tool holder includes stops for securing the locking members against axial displacement during rotary drilling. One stop is movable relative to the retainer sleeve and can be locked in position. Another stop forms part of the retainer sleeve. The stops combine with the closed ends of the recesses in the tool shank for holding the locking members against axial displacement.

9 Claims, 3 Drawing Figures

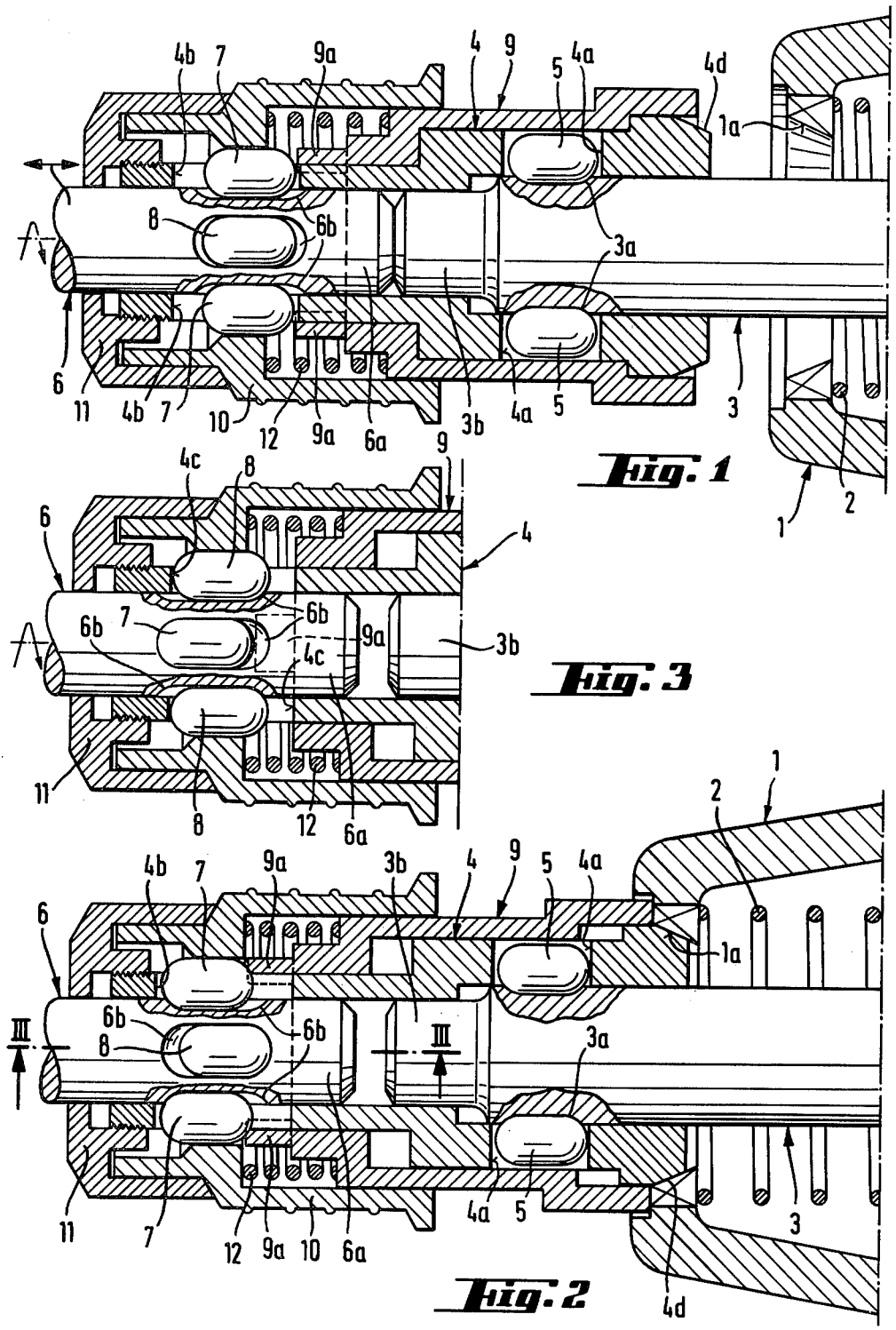

HAMMER DRILL FOR PERFORMING ROTARY DRILLING OR PERCUSSIVE DRILLING

SUMMARY OF THE INVENTION

The present invention is directed to a hammer drill including a housing and a tool holder axially displaceable relative to the housing. The hammer drill can perform percussive drilling or rotary drilling. When rotary drilling is carried out, the tool holder is in supporting contact with the housing. The shank of a tool can be held in the tool holder with axial play by locking members mounted in the tool holder and engageable in axially extending closed end recesses in the tool shank.

Hammer drills which operate in the low and medium capacity range can, in addition to performing percussion drilling, carry out only rotary drilling. The requirements for the tool holder where these two different types of drilling operations are performed, are very different.

In percussion drilling, the combination of the drilling capacity and the transmission of percussive energy to the tool requires that the movement of the tool is as free as possible from losses, however, in rotary drilling which requires accurate application of the tool to the material being drilled, the concentric or true running of the tool is most important. To transmit percussive force to the shank as free of losses as possible, it is customary to hold the tool shank in the tool holder with a certain amount of axially play. As a result, the tool shank can be axially displaced in the tool holder to a limited extent so that its rear end located within the holder comes in direct contact with the front end of an impact anvil. Wear takes place because of the relative movement of the tool shank in the tool holder and in time such wear leads to radial play between the shank and the holder. To avoid friction and the loss of percussive energy, the impact anvil has an unavoidable amount of radial play relative to its guiding surfaces. Finally, as a rule, the tool holder is not rigidly connected to the impact anvil, rather the tool holder and impact anvil are interconnected with a certain axial play along with the unavoidable radial play. Due to the accumulation of all of the radial play which is present, there can be a considerable oblique or off-center setting of the impact anvil relative to the housing, of the tool holder relative to the impact anvil and also of the tool within the tool holder. The angular deviation results to as much as several millimeters over the axial length of the tool up to its tip or cutting edge. Accordingly, the conditions are not favorable for rotary drilling.

The primary object of the present invention is to provide a hammer drill which permits optimum operation during both percussion drilling and rotary drilling.

In accordance with the present invention, the desired operation is obtained through a combination of the following characteristic features:
(a) The tool holder and the hammer drill housing have centering means which engage one within the other affording support for the tool holder during rotary drilling.
(b) The tool is secured within the tool holder between two stops when rotary drilling is to be performed. One of the stops is formed on the retainer sleeve in the tool holder while the other stop is axially displaceable and can be fixed relative to the retainer sleeve. At least two locking members are uniformly arranged about the circumferential periphery of the tool shank and can be held in position between at least one of the stops and the recesses on the tool shank.

In accordance with the present invention, the tool holder is directly centered on the housing and, at the same time, the tool shank is held against axial displacement as well as being centered in the tool holder. With this construction, the concentric running of the tool is ensured.

For production reasons, it is advisable to form the centering means as a centering shoulder formed on the tool holder and a centering hole in the housing. Such a construction requires no special expenditure, since the housing has a through-hole for the impact anvil and only a centering insert is needed on the end of the tool holder shaped in accordance with the tool holder diameter.

In principle, the centering shoulder and the centering hole can be cylindrically shaped. Since radial play may develop because of wear, it is advantageous if the centering shoulder and the centering hole are frusto-conically shaped with the frusto-conical surfaces narrowing in the direction opposite to the drilling direction. Such an arrangement affords a self-centering bevel seat. Furthermore, the centering of the tool holder in the housing is automatically achieved when the hammer drill presses against the surface to be drilled.

With the tool holder supported on the housing, there is relative movement between the tool holder and the housing during rotary drilling. To limit wear as much as possible, it is preferred that the centering means is formed as a slide bearing. The limitation of wear can be effected by selecting the materials of the two parts sliding on one another so that there is a small friction coefficient. Materials suitable for such a purpose are gray cast iron, bronze or certain plastics such as PTFE (Teflon). Moreover, friction can be reduced by using lubricants such as grease or oil.

During rotary drilling, considerable forces are developed in the region where the tool holder is supported on the housing. To keep the friction losses occurring because of these forces as low as possible, it is advantageous if the centering means is formed as a roller bearing. Tapered or conical roller bearings can be used which absorb both axial and radial forces.

To assure that the tool holder is supported on the housing during rotary drilling it is advisable to provide biasing means which hold the tool holder against the housing. Axial play which may be present can be eliminated through such biasing means. For the changeover between percussion drilling and rotary drilling, the biasing means can be in the form of a cam and a stopping curve. The stopping curve can be a coarse thread. To facilitate the changeover, additional spring means can be provided.

To grip or hold the tool against axial displacement, one of the stops can be axially displaced relative to the retaining sleeve within the tool holder and it can be fixed in position. To facilitate the operation of the tool holder, the axially displaceable and fixable stop can be positioned on an actuating member such as a sliding sleeve laterally surrounding the retainer sleeve. The actuating member can be operated regardless of the condition of the hammer drill. To avoid any incorrect handling of the actuating member, it can be engaged with a switch-over device for changing between percussion drilling and rotary drilling. As a result, it is possible to prevent percussion drilling operation if the tool is secured against axial movement and it is guaranteed that the tool is held against axial movement during rotary drilling operation. When the actuating member is a sliding sleeve, imbalance of the tool holder is avoided. Moreover, the sliding sleeve can be actuated in any rotary position of the tool holder.

For a simple arrangement of the tool holder it is preferable to position the axially secured locking members between the axially displaceable stop and a shoulder formed in one of the axially extending closed ended recesses in the tool shank. Thus, to fix the tool against axial movement, initially one of the locking members is pushed against the shoulder of the recess on the tool shank cooperating with the axially movable stop and then the tool is displaced axially against the fixed stop formed on the retaining sleeve by means of the locking members. By means of the locking members, secured between the axially displaceable stop and the shoulder on the corresponding recess in the tool shank, a positive engagement is obtained between the tool shank and the axially displaceable stop so that it is unnecessary to provide any direct engagement of the stop with the tool shank.

It is also possible to secure the locking members between the stop formed on the retainer sleeve of the tool holder and a shoulder is one of the recesses on the tool shank. In this arrangement it is also possible to assure that a positive engagement is provided for the locking members between the stop and the tool shank so that the stop does not project into contact with the tool shank.

For a uniform distribution of the forces in the tool holder as well as in the tool shank, it is preferably if four locking members are used arranged in pairs with the locking members of each pair disposed diametrically opposite one another. One pair of locking members are secured between the stop formed on the retainer sleeve of the tool holder and the oppositely disposed shoulder on the corresponding recesses on the tool shank. The other pair of locking members are secured between the axially movable stop and the shoulder on the corresponding recesses on the tool shank. Accordingly, the tool shank is secured against axial movement by each pair of the locking members. Since the axial forces always occur in pairs, they cannot cause an oblique or off-centered setting of the tool in the tool holder, when there is radial play between the tool and the tool holder. Through the equi-angular arrangement of the four locking members about the circumference of the tool shank, any unbalance of the tool holder can be avoided. With four recesses uniformly angularly arranged around the tool shank, the tool can be locked in position regardless of the position at which it is inserted merely by turning it through less than 90°. Moreover, by distributing the forces through several locking members, wear on the tool as well as on the tool holder can be reduced.

For transmitting torque, it is preferable if the locking members are formed as rollers to reduce surface pressure. When more than two locking members are used, the functions of torque transmission and axial securement can be assigned to different ones of the locking members. Accordingly, locking members which are used only for the axial securement of the tool can be formed as balls which can be economically produced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending sectional view of a part of a hammer drill embodying the present invention and illustrated in the percussion drilling condition;

FIG. 2 is a sectional view of the hammer drill similar to FIG. 1, however, with the drill shown in the rotary drilling condition; and FIG. 3 is a sectional view of the hammer drill taken along the line III—III in FIG. 2.

DETAIL DESCRIPTION OF THE INVENTION

In FIGS. 1–3 a hammer drill is illustrated including a housing 1 shown only in part. A spring 2 is positioned within the housing 1. Impact anvil 3 is guided in the housing 1 so that it is axially displaceable. To reduce friction, the impact anvil 3 has a certain amount of radial play relative to its guide means in the housing 1. Adjacent its front end, the impact anvil 3 has axially extending grooves 3a and, forwardly of the grooves, the impact anvil has a reduced diameter part 3b. The tool holder positioned forwardly of the housing 1 includes an axially extending retainer sleeve 4 connected to the impact anvil 3 by drive members 5. Retainer sleeve 4 has axially extending windows 4a in the region extending along the impact anvil 3 and axially extending windows 4b, 4c in the region of the shank 6a of the axially extending tool 6. Tool 6 is inserted into the front end of the retainer sleeve 4 with its tool shank 6a corresponding in diameter to the reduced diameter front part 3b of the impact anvil 3. Tool shank 6a is provided with a number of axially extending closed ended recesses 6b distributed equi-angularly apart around the outer circumferential periphery of the shank. The drive members 5 engaging within the grooves 3a of the impact anvil 3 are positioned in windows 4a in the retaining sleeve. Windows 4b contain locking members 7 and windows 4c contain locking member 8 and the locking members extend inwardly into engagement within the recesses 6b in the tool shank 6a. In the axial direction, the recesses 6b are longer than the locking members 7, 8 so the tool 6 held in the retainer sleeve 4 has a certain amount of axial play, that is, when the hammer drill is in the percussion drilling condition. As viewed in the drawing, the front end of the tool holder is at the left and the rear end of the tool holder is at the right. A centering shoulder 4d is provided on the rear end of the retaining sleeve and the shoulder is frusto-conically shaped with its surfaces converging in the direction opposite to the drilling direction of the tool which is the direction toward the front end of the tool holder. Housing 1 has a centering opening 1a formed complementary to the centering shoulder 4d. In the tool holder, a sliding sleeve 9 laterally encircles the retaining sleeve 4 and the sliding sleeve is axially displaceable to a limited extend relative to the retaining sleeve. The front end of the sliding sleeve 9 has two stops 9a arranged diametrically opposite one another relative to the axis of the tool holder and the tool. When the sliding sleeve 9 is moved from the position shown in FIG. 1 to that in FIG. 2, the stops act on the locking members 7. An axially displaceable gripping sleeve 10 is located in the front region of the tool holder with its rear end laterally encircling the front region of the sliding sleeve 9. Gripping sleeve 10 is secured by a cover cap 11 which is screwed onto the front end of the retaining sleeve 4. A pressure spring 12 is located within the gripping sleeve 10 and is in contact at its front end with the gripping sleeve and at its rear end with a shoulder on the sliding sleeve 9. When the gripping sleeve 10 is displaced in the rearward direction against the biasing action of the pressure spring 12, it is displaced axially rearwardly out of engagement with the locking members 7, 8 so that these locking members can move radially outwardly out of the recesses 6b in the tool shank 6a permitting the tool to be removed from the tool holder.

When the hammer drill is in the rotary drilling condition as shown in FIG. 2, the tool holder is held axially relative to housing 1 by the impact anvil 3 via spring 2. In addition, centering shoulder 4d on the rear end of the retainer member is seated within the centering hole 1a. As a result, the tool holder is centered on the housing 1. To reduce friction, the centering hole 1a can be formed as a slide bearing or a roller bearing. When the tool holder is pressed rearwardly against the housing 1 with the rear end of the retainer sleeve seated within the centering hole 1a, the sliding sleeve 9 is displaced axially forwardly relative to the retainer sleeve 4. At the same time, locking members 7 are contacted by the stops 9a and the locking members are displaced forwardly until their forward ends contact the front shoulders of the recesses 6b in the tool shank and cause the tool 6 to move forwardly relative to the retainer sleeve. The forward movement of the tool 6 causes the locking members 8 to move in the corresponding recesses 6b until they contact the rear shoulders of the recesses and then move into contact with the front ends or edges of the windows 4c in the retaining sleeve. Since the axial dimension of the windows 4b is greater than that of the windows 4c, the locking members do not move into contact with the front edges of the windows 4b. Accordingly, the tool 6 is held against axial displacement between the axially displaceable stop 9a and the fixed stop 4b through the locking members 7, 8. The locking members are made up of one pair of locking members 7 and another pair of locking members 8 with the locking members in each pair being diametrically opposite one another so that no pitching or tilting movements occur on the tool shaft 6a.

In FIG. 2, the locking members 7 are shown held between the axially displaceable stop 9a and the shoulder at the front end of the corresponding recess in the tool shank in which the locking member is seated. In FIG. 3 the locking members 8 are shown held by the stop formed by the front edge of the window 4c and the rear shoulder of the recess in the tool shank in which the locking member 8 is seated. Accordingly, the tool 6 is held against axial movement by the displacement of the sliding sleeve 9 relative to the retaining sleeve 4. In addition, retaining sleeve 4 is centered relative to the housing 1. Due to the cooperating relationship of these two features, tool 6 is axially aligned exactly with the hammer drill axis for performing rotary drilling.

While specific embodiments of the invention have been shown and described in detail to illustrate the application of the inventive principles, it will be understood that the invention may be embodied otherwise without departing from such principles.

We claim:

1. Hammer drill for performing percussion drilling or rotary drilling comprising a housing having a front end, a tool holder axially displaceably mounted relative to the front end of said housing and said tool holder having a front end and a rear end with the rear end disposed in supported contact with the front end of said housing when the hammer drill is arranged to perform rotary drilling, said tool holder including an axially extending retainer sleeve arranged to hold a tool shank, said retainer sleeve includes locking members engageable in axially extending closed ended recesses in the tool shank for holding the tool shank with axial play, wherein the improvement comprises centering means on the front end of said housing and on the rear end of said retainer sleeve for centering said tool holder with the rear end thereof disposed in supported contact with the front end of said housing, said locking members being uniformly angularly spaced apart around the axis of said retainer sleeve, stop means located within said tool holder for engagement with said locking members for holding said locking members against axial displacement in the recesses in the tool shank, said stop means being axially displaceable relative to said locking member and including a first stop and a second stop with said first stop being formed on said retainer sleeve, said second stop is axially displaceable relative to said retainer sleeve and can be fixed in position for securing one of said locking members between said first stop and the end of one of the recesses in the tool shank and another of said locking members between said second stop and the end of another one of the recesses in the tool shank.

2. Hammer drill, as set forth in claim 1, wherein said centering means comprises a centering shoulder formed on the rear end of said retainer sleeve and a centering hole formed in the front end of said housing.

3. Hammer drill, as set forth in claim 2, wherein said centering shoulder and centering hole are frusto-conically shaped with the frusto-conical surfaces converging in the direction opposite to the drilling direction which is in the rear end toward the front end direction of the retainer sleeve.

4. Hammer drill, as set forth in claims 1, 2 or 3 wherein said centering means includes a bearing.

5. Hammer drill, as set forth in claims 1, 2 or 3, including means for holding said tool holder against said housing when the hammer drill is in the rotary drilling condition.

6. Hammer drill, as set forth in claims 1, 2 or 3, including a sliding sleeve encircling and axially displaceable relative to said retainer sleeve, said second stop formed on said sliding sleeve.

7. Hammer drill, as set forth in claims 1, 2 or 3, wherein one of said locking members in the rotary drilling condition of the hammer drill is fixed against axial displacement between said second stop and the shoulder on the recess in the tool shank in which the locking member can be seated.

8. Hammer drill, as set forth in claim 7, wherein another one of said locking members is held against axial displacement between said first stop and a shoulder on the recess in the tool shank into which the locking member can be seated.

9. Hammer drill, as set forth in claims 1, 2 or 3, including four said locking members arranged in two pairs with the locking members in each of said pairs disposed in diametrically opposite relation, two of said second stops, each of said locking members in one pair being held between one of said second stops and a shoulder on the recess in the tool shank into which the locking member can be seated, two said first stops, each of said locking members in the other pair of said locking members being held against axial displacement between one of said first stops and a shoulder in the recess in the tool shank into which the locking member can be seated.

* * * * *